United States Patent [19]
Horowitz et al.

[11] Patent Number: 6,111,988
[45] Date of Patent: Aug. 29, 2000

[54] FRACTAL REPRESENTATION OF DATA

[75] Inventors: Franklin G. Horowitz, Sorrento; Donald J. Bone, Kaleen; Jan P. Veldkamp, Narrabundah, all of Australia

[73] Assignee: Commonwealth Scientific and Industrial Research Organisation, Campbell, Australia

[21] Appl. No.: 08/765,676

[22] PCT Filed: Jul. 3, 1995

[86] PCT No.: PCT/AU95/00401

§ 371 Date: Apr. 24, 1997

§ 102(e) Date: Apr. 24, 1997

[87] PCT Pub. No.: WO93/17519

PCT Pub. Date: Sep. 2, 1993

[30] Foreign Application Priority Data

Jul. 1, 1994 [AU] Australia ........................... PM6615

[51] Int. Cl.[7] .................................................. G06K 9/36
[52] U.S. Cl. .................................. 382/249; 382/232
[58] Field of Search .................................. 382/232, 240, 382/249; 358/426, 403, 262.1, 432, 433; 348/403

[56] References Cited

U.S. PATENT DOCUMENTS

| 4,903,317 | 2/1990 | Nishihara et al. | 382/244 |
| 4,941,193 | 7/1990 | Barnsley et al. | 382/56 |
| 5,048,112 | 9/1991 | Alves et al. | 382/56 |
| 5,274,466 | 12/1993 | Ida et al. | 382/249 |
| 5,563,718 | 10/1996 | Wober et al. | 358/432 |
| 5,757,852 | 5/1998 | Jericevic et al. | 382/232 |
| 5,768,437 | 6/1998 | Monro et al. | 382/249 |

FOREIGN PATENT DOCUMENTS 0453827 10/1991 European Pat. Off. .
WO93/17519 9/1993 WIPO .

OTHER PUBLICATIONS

Image Codec by Non causal Prediction, Residual Mean Removal, Amir Asif et al, IEE Transaction on Circuits & Syst. for Video Tech., 1996.
Motion Comp. for Video Compression using Control Grid Interpolation, Gary J. Sullivan IEEE/ 1991.
Coding of Two-ton Images, Thomass, Huang et al IEEE Transactions on Communications, 1977.

*Primary Examiner*—Amelia Au
*Assistant Examiner*—Samir Ahmed
*Attorney, Agent, or Firm*—Rockey, Milnamow & Katz, Ltd.

[57] ABSTRACT

A method is provided for the fractal representation of data in which a representative continuous n-dimensional surface is defined as a first approximation to the original data. Residual data is formed from the date and the n-dimensional surface, and is then divided into a first number of regions. For each of the first number of regions, the following steps are performed: A number of domain regions are determined from the data; for a current one of each of the domain regions, a second representative n-dimensional surface is formed from the current domain; a (domain residual is formed from the current domain region; and the second representative n-dimensional surface, and a closest distance or error measure is determined. After processing each of the regions, the representation of data is stored.

20 Claims, 16 Drawing Sheets

FRACTAL REPRESENTATION OF DATA

FIELD OF THE INVENTION

The present invention relates to methods for the fractal representation of data and in particular to the use of such representations in the compression of data.

BACKGROUND ART

The representation and/or the compression of data, such as images or sound, can generally be divided into two classes. The first class, commonly called "lossless" allows for an exact reconstruction of the original data from the compressed or represented data in the reconstruction or decompression process. Lossless compression normally proceeds by removal of real redundancy in the data and includes such techniques as run length encoding, Hufftnan coding and LZW coding which are techniques well known to those skilled in the art of compression methods.

A second class of techniques, known as "lossy" techniques represent or compress their data such that, upon decompression or reconstruction, the decompressed or reconstructed data may vary in comparison to the original data. Lossy techniques are able to be used where it is not necessary to exactly reconstruct the original data, with a close approximation to it, in most cases, being suitable. Of course, it will be readily apparent to those skilled in the art that, after initial compression via a lossy technique, the resulting compressed data can be further compressed utilising a lossless technique.

One form of well known lossy image compression utilises the Discrete Cosine Transform (DCT) in order to compress an image as part of a lossy compression system. This system, as defined by the Joint Photographic Experts Group (JPEG) standard has become increasingly popular for the compression of still images. A further standard, known as the MPEG standard developed by Motion Pictures Expert Group, has also become a popular form of video image compression. The MPEG standard also relies on the Discrete Cosine Transform for the compression of images.

An alternative compression or representation system is one based on "fractal" coding. The fractal coding technique relies on the creation of a series of transformations which, when applied to a set of data, result in that data approaching a "fixed point" which approximates the original data which is desired to be displayed. Therefore, in order to regenerate an approximation of the data utilising fractal techniques, it is only necessary to know the nature and content of the transformations as, given some initial arbitrary data, the transformations can be applied to that data in an iterative process such that the arbitrary data is transformed into a close approximation of the original data.

As, the data can be represented by its transformations, fractal coding techniques offer the opportunity to produce substantial compression of data and, in particular, offer the opportunity to produce a better compression system than the JPEG standard. Examples of fractal compression or representation techniques can be seen from PCT Publication No. WO 93/17519 entitled "Fractal Coding of Data" by Monro and Dudbridge, in addition to "Image Coding Based on a Fractal Theory of Iterated Contractive Image Transformations" by A. E. Jacquin published in IEEE Transactions on Image Processing, 1, pages 18–30, (1990).

The iterated nature of producing a final image through the continuous utilisation of transformations has led to fractal coding techniques being described as an "Iterated Function System (IFS)". The transformations utilised in the IFS are commonly of a contractive nature in that the application of a transform results in the data "contracting" to a final set of data in accordance with a "difference measure" which can be a Root Mean Square (RMS) measure or a Hausdorff distance measure, known to those skilled in the art.

Although the discussion will hereinafter be continued in relation to images, it will be readily apparent to those skilled in the art that the present invention is not limited to images and is readily applicable to any form of data for which a fractal representation or compression is desired. Furthermore, although 2-D data is referred to in the following description, lower and higher dimensional data sets can easily be accommodated with analogous methods by those skilled in the art.

Referring now to FIGS. 1 and 2, the prior art iterated functions systems normally operate by partitioning an initial image 1 into a number of range blocks 2 which completely tile or cover the initial image 1.

In the system set out in the aforementioned article by Jacquin, the pixels in each range block 2 are approximated by a linear combination of a first element which is derived from a range base function which is defined by Jacquin to be of uniform intensity. The second portion of each pixel of a range block 2 is made up of pixels derived from a transformation of pixels belonging to some other part of the image. These other portions of the image, which can be derived utilising a number of different methods, are known as "domain" blocks. These domain blocks are transformed utilising carefully selected affine transformation functions. The affine transformation functions and their selection corresponds to the "fractal" portion of the image and, in the Jacquin system, they are used to modulate each pixel of the range block 2.

In PCT Publication No. WO 93/17519 entitled "Fractal Coding of Data", Monro and Dudbridge describe a system whereby the range base function consists of a planar facet. The range blocks are tiled in their entirety by four domain blocks. The planar facet is "corrected" or modulated by the application of a scaled version of the domain block which is one quarter the area of the original domain block. The major advantage of the Monro and Dudbridge technique is that an extensive search for the most suitable domain block is avoided.

SUMMARY OF THE INVENTION

It is an object of the present invention to provide an improved form of fractal based coding of data.

In accordance with a first aspect of the present invention, there is provided a method of coding original data comprising the steps of:

(a) defining a representative continuous n-dimensional surface as a first approximation to said original data, (b) forming residual data from said original data and said representative continuous n-dimensional surface, (c) dividing the residual data into a first number of regions, (d) for each of said first number of regions:

(e) determining a number of domain regions from said original data, said domain regions comprising transformed portions of said original data, (f) for a current one of each of said domain regions, forming a second representative n-dimensional surface from said current domain region, (g) forming a domain residual from said current domain region and said second representative n-dimensional surface, (h) determining a closest distance or error measure between each of said domain residual and said a current one of each of said first number of regions, and, (i) storing surface information defining said representative continuous n-dimensional surface and location and transformation data disclosing said domain region having a domain residual having a said closest distance or error measure, for each of said first number of regions.

In accordance with another aspect of the present invention there is provided a method of decoding data which has been coded in accordance with preceding paragraphs, said method of decoding comprising the steps of:

(a) defining said representative continuous n-dimensional surface from said surface information, (b) dividing said surface into said first number of regions, (c) for each of said first number of regions, applying the steps of:

(d) determining a corresponding domain from said location and translation data for said region, (e) transforming said corresponding domain in accordance with said transformation data of said corresponding domain, (f) defining a second n-dimensional surface from said transformed corresponding domain, (g) calculating a second residue portion from said second n-dimensional surface and said transformed corresponding domain, (h) adding said second residue portion to the representative continuous n-dimensional surface of a current one of said first number of regions and updating current approximation of data, and (i) repeating steps (b)–(h) until said surface converges to an approximation to said decoded data.

In accordance with still another aspect of the present invention there is provided a method of encoding data comprising the steps of:

(a) deriving surface information, which defines an n-dimensional surface, as a first approximation to said data, (b) forming residual data from said data and said n-dimensional surface, (c) dividing said residual data into a first number of regions, (d) for a first one of said first number of regions, determining a corresponding series of domain regions in accordance with the following steps (e) to (j):

(e) forming a domain region series indicator list, initially comprising an empty list, (f) determining a number of prospective domain regions from said residual data, (g) for each of said prospective domain regions, determining a residual prospective domain region from said prospective domain region and an approximation to said prospective domain region, and determining a candidate measure value being a measure of the difference between said residual prospective domain region and the first one of said first number of regions, (h) determining a best matching prospective domain region, being a domain region which is not a member of said domain region series indicator list and having the smallest of said candidate measure values, (i) appending an indicator corresponding to said best matching prospective domain region to a said domain region series list, and (j) subtracting the residual prospective domain region of said best matching prospective domain region from said residual data, (k) repeating steps (e) to (j) until said residual data is less than a predetermined amount, (l) repeating steps (d) to (k) for each region of said residual data, and (m) defining said coded data to comprise said surface information and a domain region series indicator list for each of said first number of regions.

In accordance with still another aspect of the present invention there is provided a method of decoding data which has been encoded in accordance with preceding paragraphs, said method comprising the steps of:

(a) deriving a current estimate of said data comprising an n-dimensional surface derived from said surface information, (b) dividing said current estimate into said first number of regions, (c) for a first one of said first number of regions, applying the steps (d) to (g):

(d) for a first one of said indicators in said domain region series indicator list, applying the steps (e) to (f):

(e) determining, from said current estimate of said data, a domain region corresponding to said indicator, (f) forming a domain region from said domain region and said n-dimensional surface, and (g) updating the current estimate of said current one of said first number of regions with new estimate of current domain regions, (h) repeating steps (d) to (g) for each of said indicators in said domain region series indicator list, (i) repeating steps (c) to (h) for each of said first number of regions, and (j) repeating steps (c) to (i) until said data converges.

BRIEF DESCRIPTION OF THE DRAWINGS

A preferred and other embodiments of the present invention will now be described in relation to the accompanying drawings in which.

DETAILED DESCRIPTION

In the preferred embodiments a number of improvements are made over the prior art. In the preferred embodiment a representation of the original data, which for example may comprise image data, is constructed from two parts. The first part is a functional part which comprises a smooth continuous surface which approximates a representation of the data. In the case of image data, the surface will have coordinates in X and Y representing a particular pixel location and a third coordinate representing intensity. Of course, it will be readily apparent to those skilled in the art, that the present invention can be applied to other dimensional forms of data wherein the surface would become an "hyper surface".

The second portion of approximation to the image comprises a fractal part which is designed to "modulate" or alter the smooth continuous surface part. It will therefore be apparent that, upon elimination of the fractal part, a smooth continuous surface will result and this surface will comprise the upper limit to the error in the representation of a given set of data or image.

The use of a smooth continuous surface also eliminates discontinuities within block boundaries of an image when compression is extremely high.

In the preferred embodiments, the smooth continuous surface is formed by an interpolation of node points of a spline. These node points are simply a subsampling of the image and are hence obtained for very little cost. The derivation of the fractal part need only return the best scaling parameter for each block. This is a simple operation which therefore permits a much more extensive search for the best matching block.

In the preferred embodiments the mapping function of domain regions to range regions is not necessarily a fixed equation. This enables the node points in the interpolating spline to be set to be "fixed points" of the mapping equations and hence unaltered by the mapping. This occurs even when the large block has an arbitrary alignment with a small block. This flexibility is achieved by working from the small block and large block residuals with respect to an interpolation of the respective blocks on the node points for the small block and the points corresponding to the node points in the big block.

Figure 1:
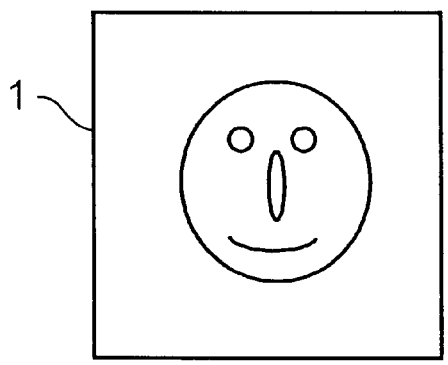
FIG. 1 illustrates a simple image.
Figure 2:
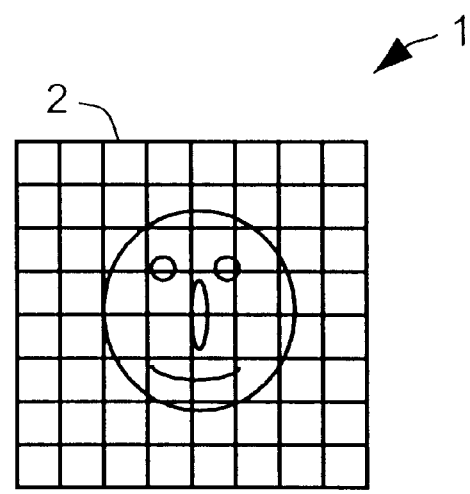
FIG. 2 illustrates the process of dividing an image into a number of small blocks.

Turning now to FIG. 1, there is shown a simple example of an image 1 of which is desired to form a fractal representation. In FIG. 2, the image 1 of FIG. 1 is firstly divided into a number of small blocks 2. For the sake of simplicity, the small blocks form a uniform and regular array of squares. However, it will be apparent to those skilled in the art that other embodiments, not comprising square regions 2, could be utilised.

Figure 3:
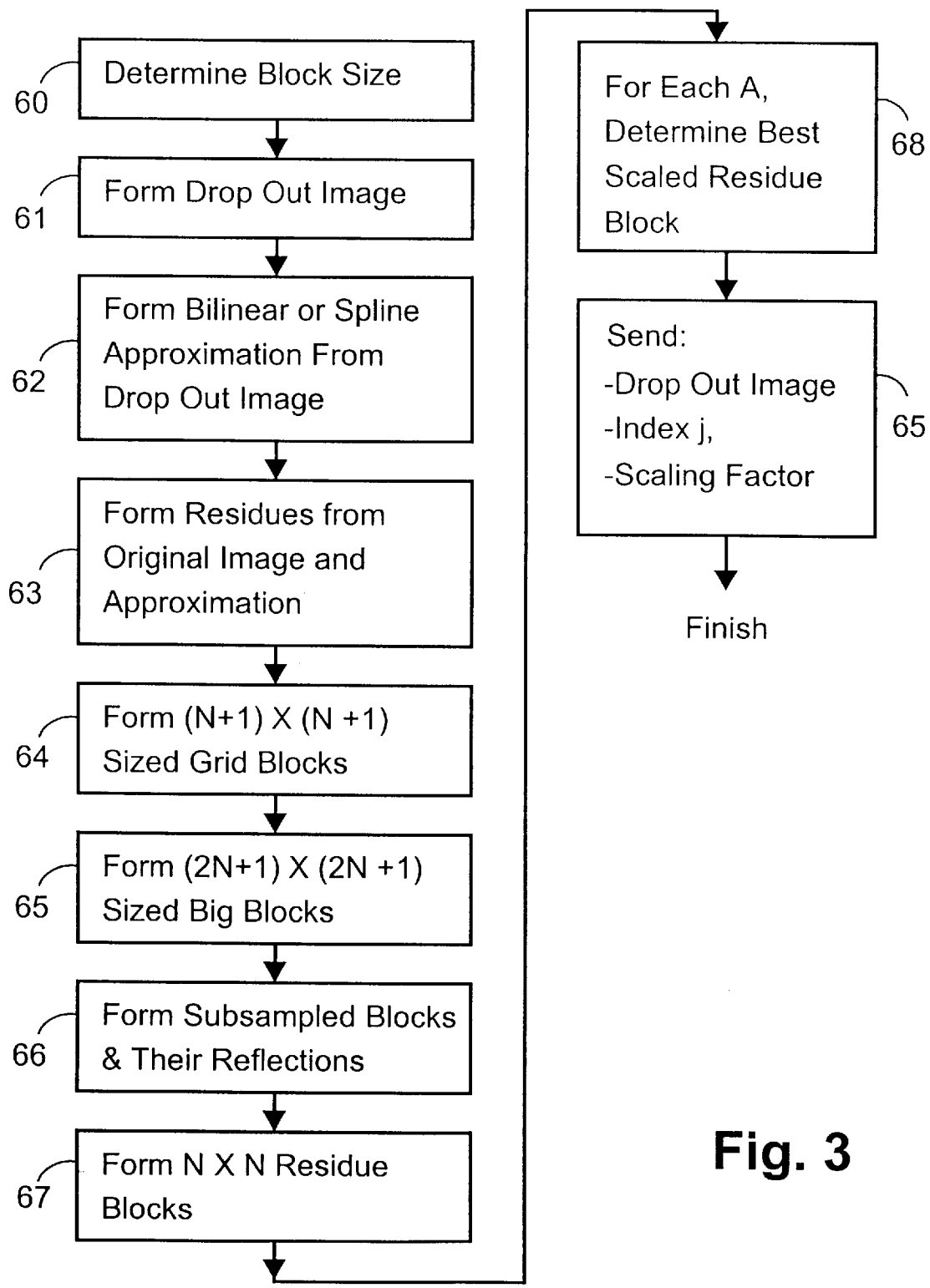
FIG. 3 is a flow chart illustrating the encoding process of a first embodiment.

Referring now to FIG. 3, there is shown a flow chart illustrating the encoding process of the first embodiment. The first step 60 in this process is the determination of the block size of each small block 2. The size of each small block 2 is determined to be an N×N pixel array with larger N allowing for greater compression.

Figure 4:
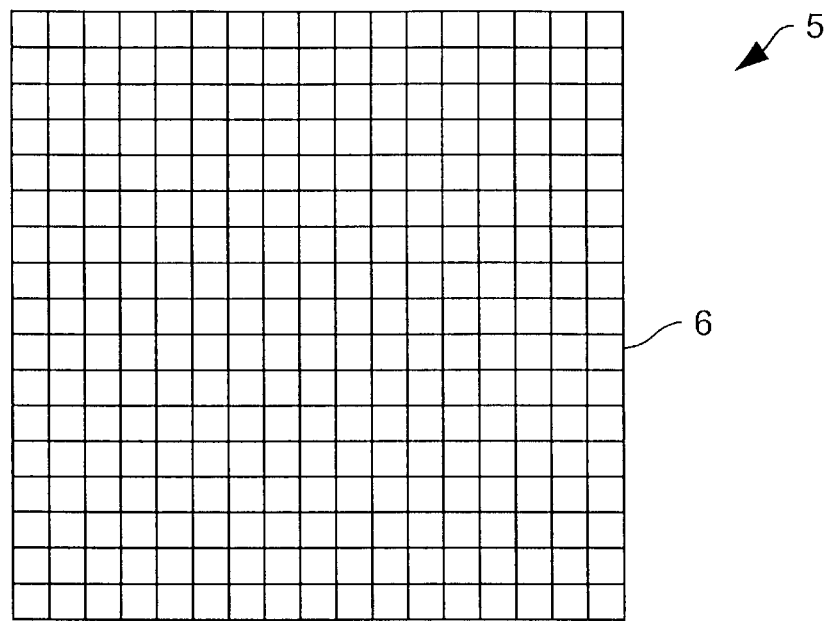
FIG. 4 illustrates an array of pixels.
Figure 5:
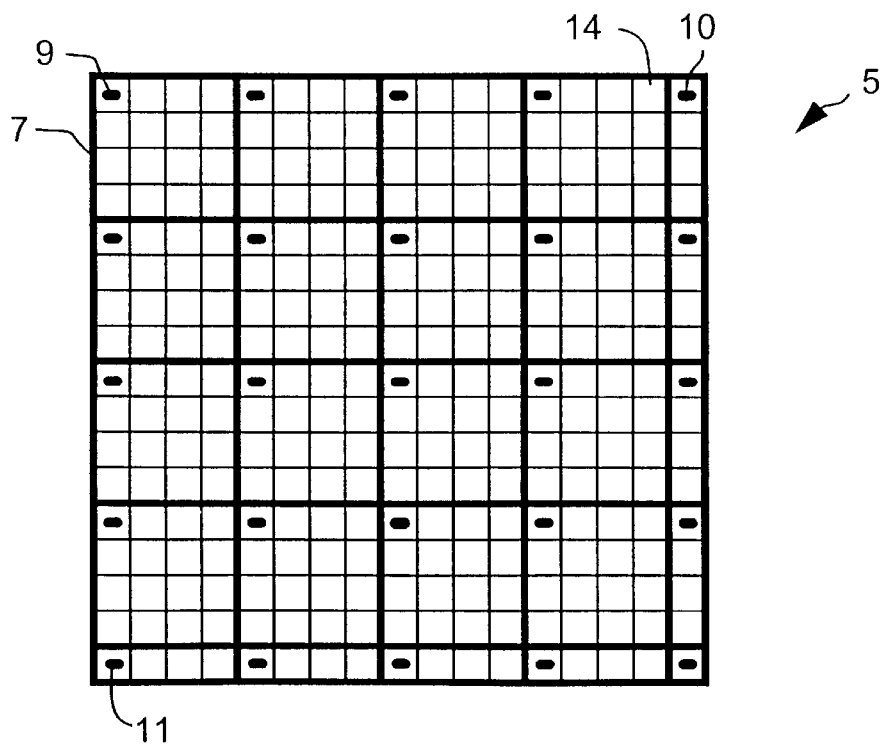
FIG. 5 illustrates the subdivision of the array of pixels of FIG. 4 into a number of small blocks.

Turning to FIG. 4, there is shown an array of pixels 5 which corresponds to an arbitrary portion of the image of FIG. 2. Each pixel 6 has three components associated with it being the X and Y locations and an intensity or level magnitude. Turning now to FIG. 5, the array of pixels is divided into a number of small blocks 7, equivalent to small block 2 of FIG. 2. In the present example N will be equal to 4.

After division of the image into small blocks 7 a "drop out" image or subsampled image is formed (step 61 of FIG. 3) from predetermined pixels e.g. 9, which are at the top left hand corners of each of the small blocks 7. Additionally, pixels on the right of the image, e.g. pixel 10, and pixels on the bottom of the image, e.g. 11, also form part of the drop out image. If necessary, these pixels can be simply repetitions of the values in the right most column and bottom most row of pixels in the image. For example, pixel 10 can merely be a repetition of pixel 14.

Upon determining the drop out image, a corresponding linear spline surface having node points corresponding to the points of the drop out image is formed (step 62 of FIG. 3). The formation of a linear spline surface from a set of node points is a process well known to those skilled in the art of computer graphics, see for example a standard textbook such as "Computer Graphics—Principles and Practice", second edition, by Foley, Van Darn, Feiner and Hughes, 1990, by Addison-Wesley Publishing Company Inc.

The linear spline surface is then used in conjunction with all the pixels 5 of the image to form a "residue" for each pixel, being the difference between the calculated surface and the pixel value (step 63 of FIG. 3). The set of residues values of each pixel for each small block is denoted Aj. Additionally, as will be seen hereinafter, the node points of the drop out image also form stationary or fixed points of the fractal mapping.

Figure 6:
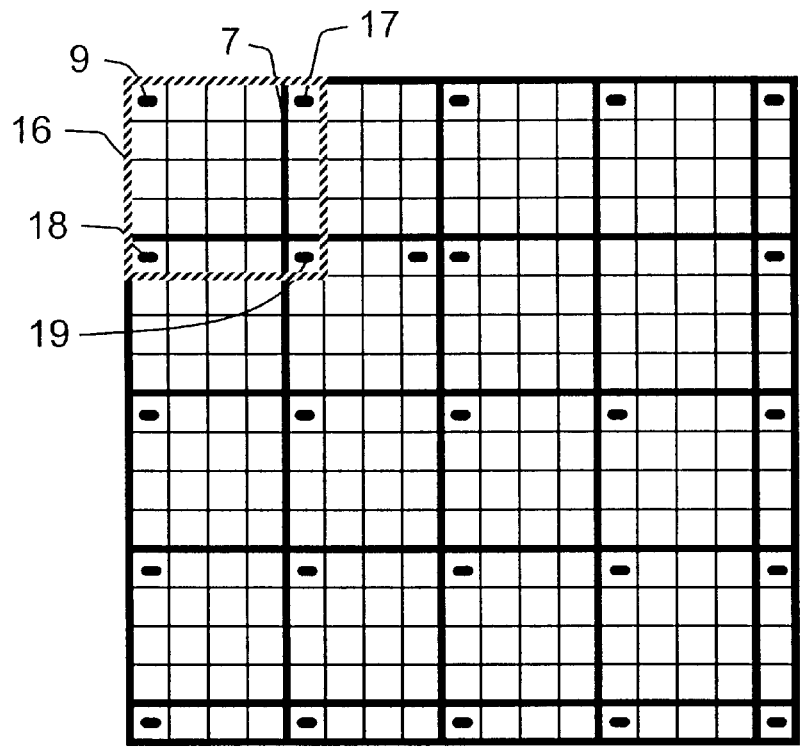
FIG. 6 illustrates the creation of grid blocks as utilized in the first embodiment.

The next step in the encoding process (step 64 of FIG. 3) is to form, for each N×N small block a corresponding (N+1)×(N+1) grid block. Referring now to FIG. 6, a grid block denoted by the hatched line 16 corresponds to the small block 7 of FIG., 5 and is bounded by the node points 9, 17–19, and has a boundary as represented by the hatched line 16.

Figure 7:
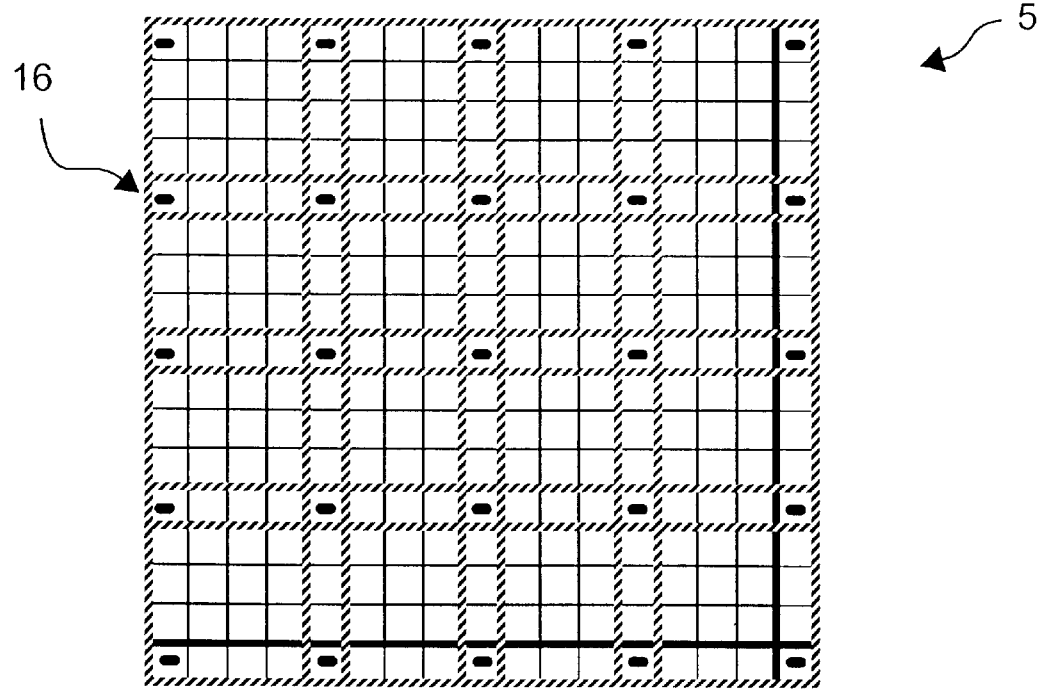
FIG. 7 illustrates the "tiling" of the image by an overlapping array of grid blocks.

FIG. 7 illustrates the "tiling" of the pixel image of FIG. 4 with overlapping grid blocks 16.

Figure 8:
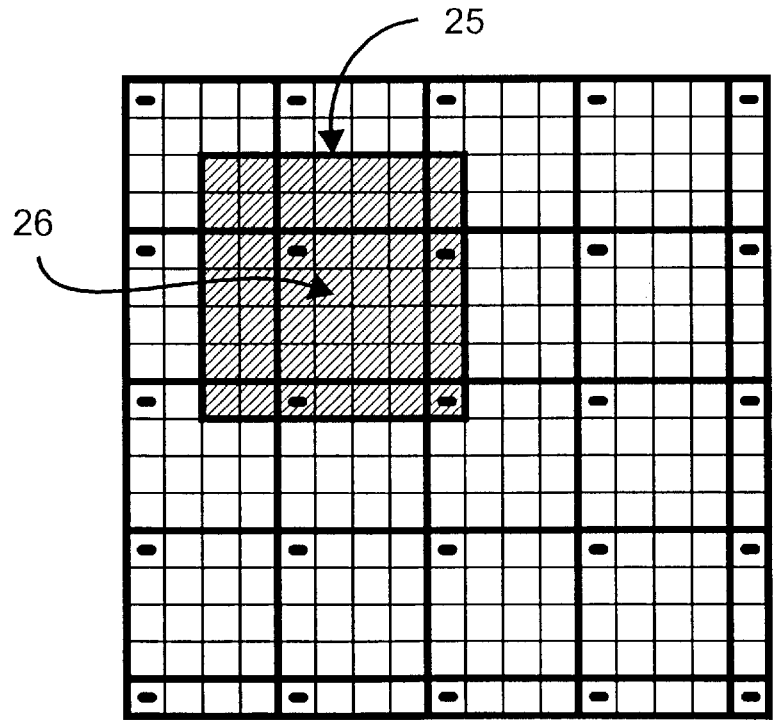
FIG. 8 illustrates the creation of big blocks as utilised in the first embodiment.

Referring now to FIG. 8, the next step in the encoding process (step 65 of FIG. 3) is to form, for each grid block, a series of big blocks 25 of size (2N+1)×(2N+1) each having a centre 26 which falls on a pixel within a corresponding grid block. As there are (N+1)×(N+1) pixels in a grid block, the number of possible big blocks 25 per grid block will be $(N+1)^2$.

The big block 25 is then subsampled in the vertical and horizontal directions starting at the top left hand corner, with the subsampling occurring every second pixel in the big block 25 (step 66 of FIG. 3). The subsampling process gives a (N+1)×(N+1) pixel block being of the same dimensions as the dimensions of the grid blocks. A linear interpolation of the subsampled big block is then calculated based on its four corner pixels.

Each of these subsampled big blocks is then denoted $\beta_k$, where k is an index indicating the pixel within the grid block which is overlayed by the centre pixel of the big block from which the subsampled big block $\beta_k$ has been formed.

In addition, all possible horizontal, vertical and diagonal reflections of each subsampled big block are considered. As there are eight possible such reflections, all of which leave the centre point of the subsampled block unchanged, the eight reflections can be indicated by a further subscript 1 in the range 0 to 7. This may include normalization of the big block (domain block) residual, described below. A residue block $B_{kl}$ is then formed by taking the top left N×N pixels of each reflected subsampled big block $\beta_{kl}$ and subtracting the linear interpolation of the corner points of the block. For simplicity, the indices k and l can be compounded into a single index j=8×k+l.

For each residue block in the set A, a search is conducted of the residue block set B to determine the best matching residue block (step 68 of FIG. 3). The matching of residue blocks can include a scaling factor $\alpha$. The matching criterion between a residue block A and a corresponding residue block B is preferably a least squares criterion. This criterion can be formulated by considering two residue blocks $A_i$ and $B_j$ and considering them to be vectors comprising pixel components in some fixed order. In order to determine the closest Root Mean Square (RMS) match, it is necessity to determine which blocks minimise the RMS error which can be expressed as follows:

$$\epsilon_{ij} = \|A_i - \alpha_{ij} B_j\| \qquad \text{Equation 1}$$

For a given i and j, the optimum scaling parameter $\alpha_{ij}$ can be calculated as follows:

$$\alpha_{ij} = \frac{A_i \cdot B_j}{\|B_j\|^2} \qquad \text{Equation 2}$$

Figure 9:
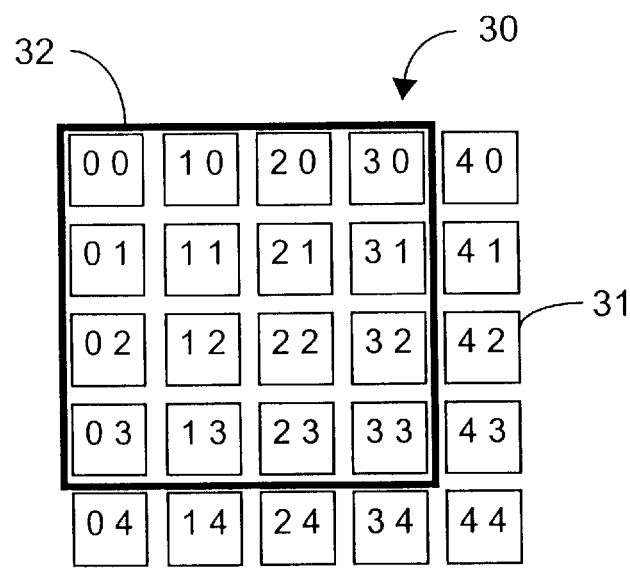
FIGS. 9 and 10 illustrate the matching process between small blocks and subsampled big blocks carried out by the first embodiment of the present invention.
Figure 10:
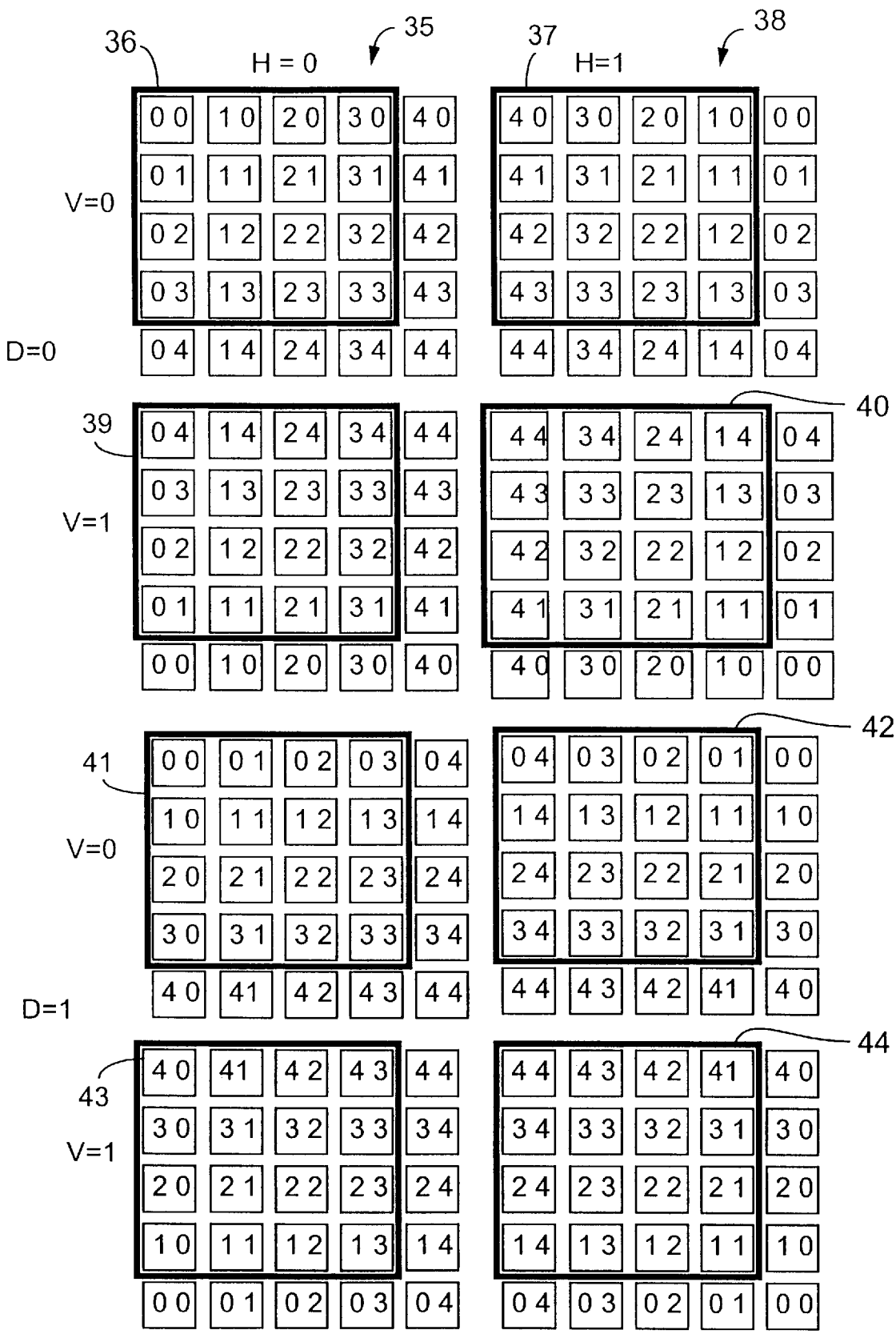

Referring now to FIGS. 9 and 10, there will now be explained an example of the matching process. In FIG. 9, there is shown a 5×5 grid block 30. Each of the pixels 31 includes indices to indicate that pixel's location within the grid block 30. The small block is indicated by the dark border 32.

Referring now to FIG. 10, there is shown various rotations and reflections of a subsampled big block, e.g. 35. These subsampled big blocks are formed from subsampling of corresponding big blocks (e.g. 25 of FIG. 8) in a manner as previously described. The portion 36 of the subsampled block 35 forms the residue block $B_{kl}$ and is compared to a corresponding portion 32 of the grid block 30. Additionally, the corresponding residue block 37 of the horizontally reflected subsampled block 35 is also compared with portion 32. This process is also carried out for vertically reflected subsampled block 39, vertically and horizontally reflected subsampled block 40, diagonally reflected subsampled block 41, diagonally and horizontally reflected subsampled block 42, diagonally and vertically reflected subsampled block 43 and a diagonally, vertically and horizontally reflected subsampled block 44. The above matching process is repeated for each of the possible big blocks whose centre lies over one of the pixels within the grid 30. In the present case, as there are 25 pixels per grid block 30 and 8 subsampled blocks formed per pixel, a total of 200 possible big blocks are tried for each small block 32.

Upon completion of this process, the representation of the image comprises the "drop out" image, and for each small block, the relative address j of the closest matching big block centre of a given rotation and the scaling factor $\alpha_{ij}$ encode the entire image (step 69 of FIG. 3).

The Decoding Process

Figure 11:
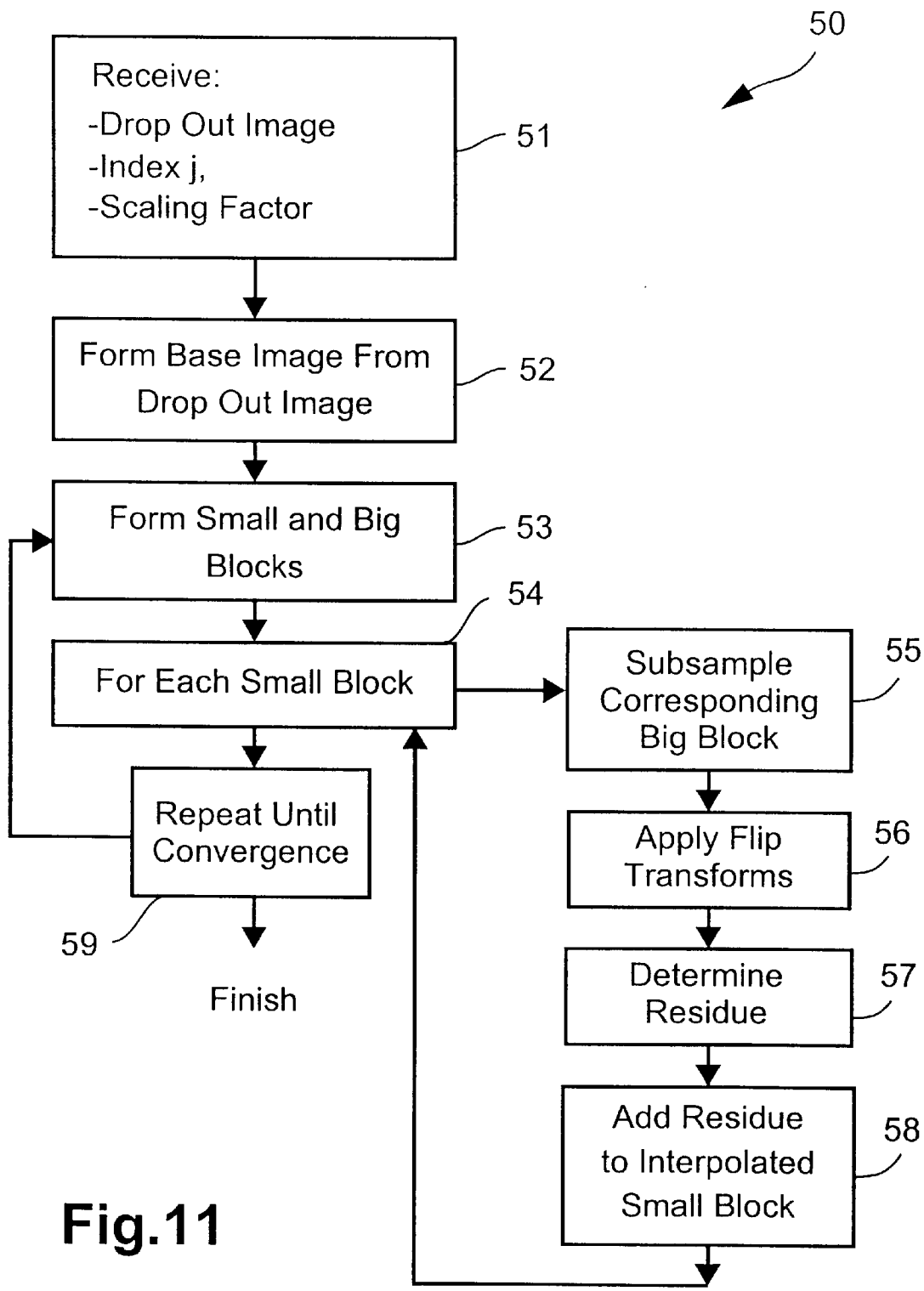
FIG. 11 is a flow chart illustrating the decoding process carried out by the first embodiment.

Referring now to FIG. 11, there is shown a flow chart of the decoding process 50. The first step in the decoding process is to receive 51 the drop out image and the index j and scaling factor data for each small block of the image.

The drop out image forms the node points for a linearly interpolated base image whose size can be different from the initial image (step 52 of FIG. 11). It will be assumed that the desired final image can be broken up into small blocks of size M×M pixels. For each M×M small block, the associated (2M+1)×(2M+1) big block, as denoted by the index j, which includes the reflection component L, is formed from the linearly interpolated image (step 53 of FIG. 11).

For each small block, the resulting big block is subsampled 55 at every second pixel location in X and Y starting at the top left hand corner of the big block so as to form to a subsampled block. The big blocks (domain blocks) are drawn from the current best estimate of the image. Initially, this is the interpolated set of grid points. After one iteration, it will have some big block information in it. Next, the appropriate X flip, Y flip or diagonal (D) flip operations are carried out 56 on the subsampled block.

A linear interpolation of the subsampled block, based on the corner points is then calculated and subtracted from the subsampled block to form 57 a residue block. The residue block is then multiplied by the scaling factor for the block. The top left M×M pixels of the resultant scaled residue is added to the corresponding interpolated small block of interpolated image determined under step 52.

The steps 55–58 are then repeated for each of the small blocks.

Subsequently, the steps 53–58 are repeated until the image converges. Convergence is measured in the normal way whereby the differences between the data of two iterations of steps 55–58 is below a predetermined error tolerance. The number of iterations before convergence will be of the order of p where $2^{p-1} < M < 2^p$. This completes the decoding process.

For a given desired compression ratio, it may be the case that the loss of image resolution is higher than desired in certain areas of the image. In this situation, one approach could be to decrease the small block size uniformly across the image. However, this is likely to be inefficient if some blocks are already represented well by the current small block size. An alternative method is to divide those residue blocks of the image which are problematical in two separate regions and to match these regions individually to corresponding B subdivided residue regions. In accordance with the above process, this block division need not result in regular or even contiguous regions so long as a division is compactly representable. Because each region of a divided small block will have a small number of pixels to match, the match will be improved over that for the whole block. It is likely that this process will cause minimal decrease in compression ratios. Of course, some encoding of the division process is necessary. One obvious form of encoding is a quadtree encoding, known to those skilled in the art and requiring only one bit for each node in the quadtree to encode the quadtree structure. This allows a small block to be subdivided only where necessary thereby maintaining high compression ratios.

It should be noted that for reasonably well encoded images, the error vector $A_i - \alpha_{ij} B_j$ is approximately orthogonal to $A_i$. This means that the size of the error is relatively insensitive to the scale factor $\alpha_{ij}$. It is therefore possible to coarsely quantise the scale factors $\alpha_{ij}$ without significant impact on accuracy. Further, for a given accuracy, the values of interpolation nodes need only to be encoded to the order of the accuracy required. Therefore, for an RMS error requirement of say 8/255, for an image having 256 intensity levels for each pixel, it would only be necessary to utilise four bits for each of the grid points or interpolation nodes and the RMS error at these node points would still be of the order of the required accuracy.

A second embodiment of the present invention which allows each range block to draw on multiple domain blocks will now be illustrated. In this alternative embodiment, a form of interpolation is used which is able to fit an irregular set of points. One form of suitable interpolation, well known to those skilled in the art of numerical methods, is that of triangular linear patches.

Figure 12:
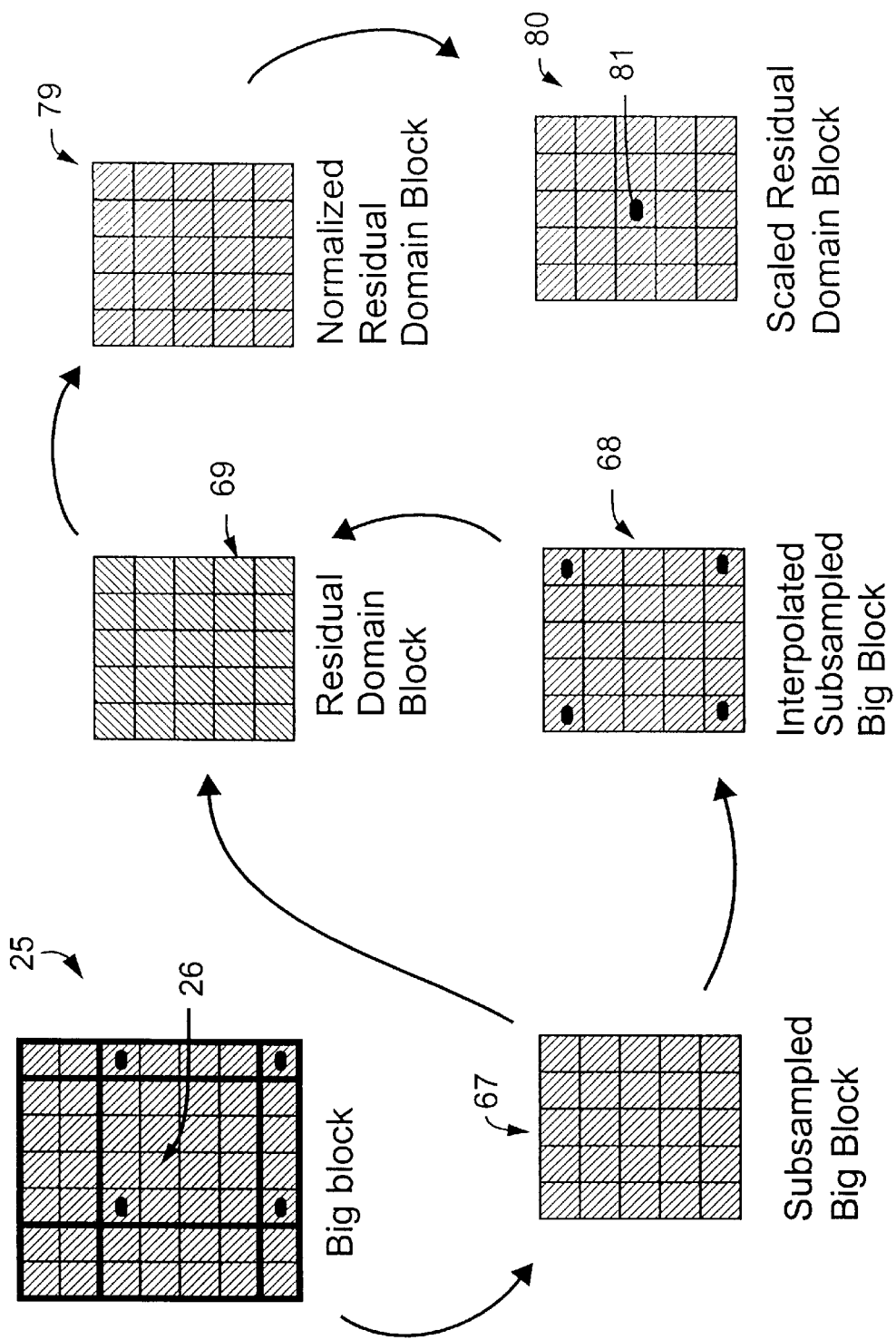
FIG. 12 illustrates the process of formation of a scaled residual domain block from a big block as utilized in a second embodiment of the present invention.
Figure 13:
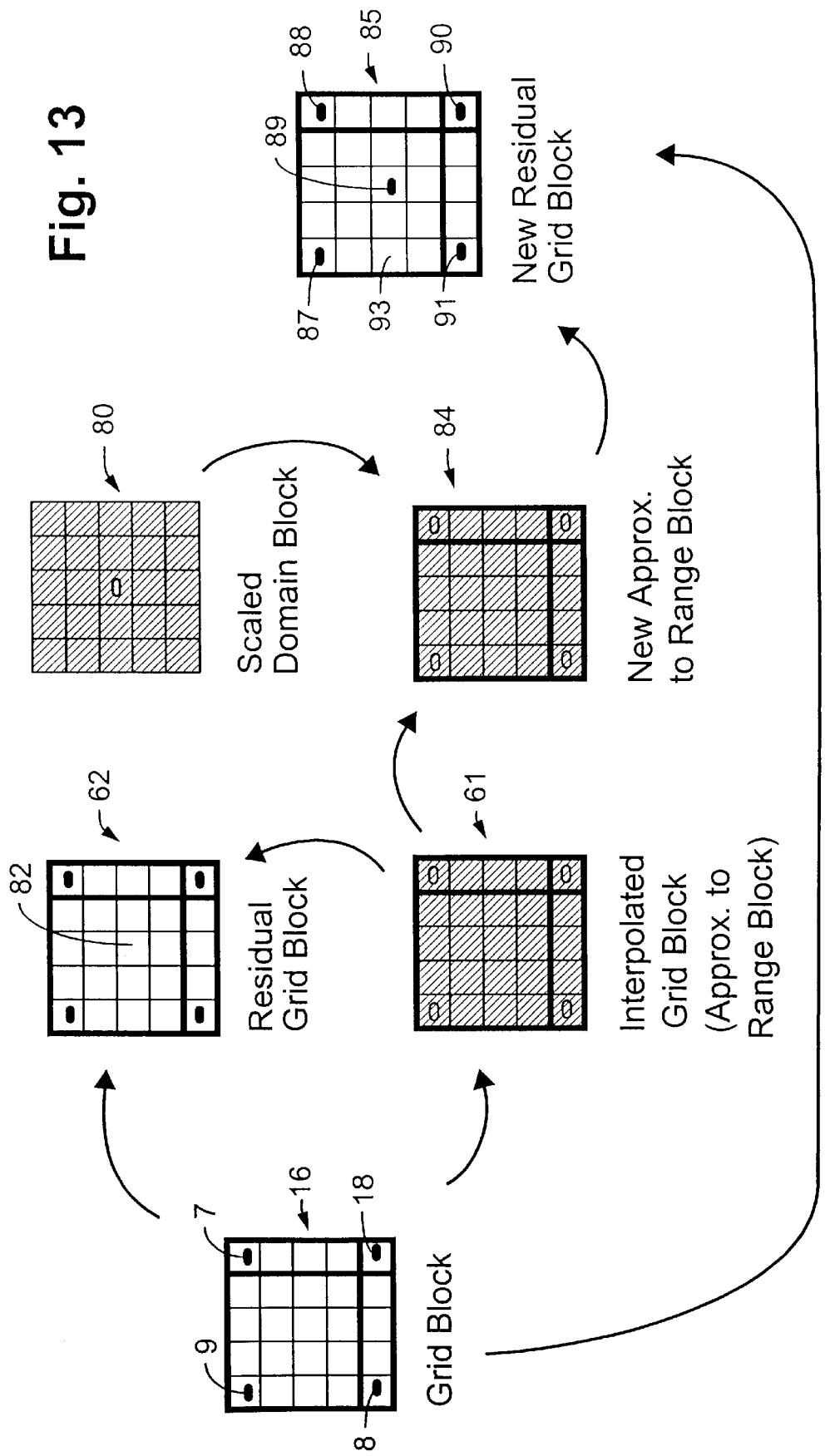
FIG. 13 illustrates the process of forming a residual grid block from an initial grid block as utilized in the second embodiment of the present invention.
Figure 14:
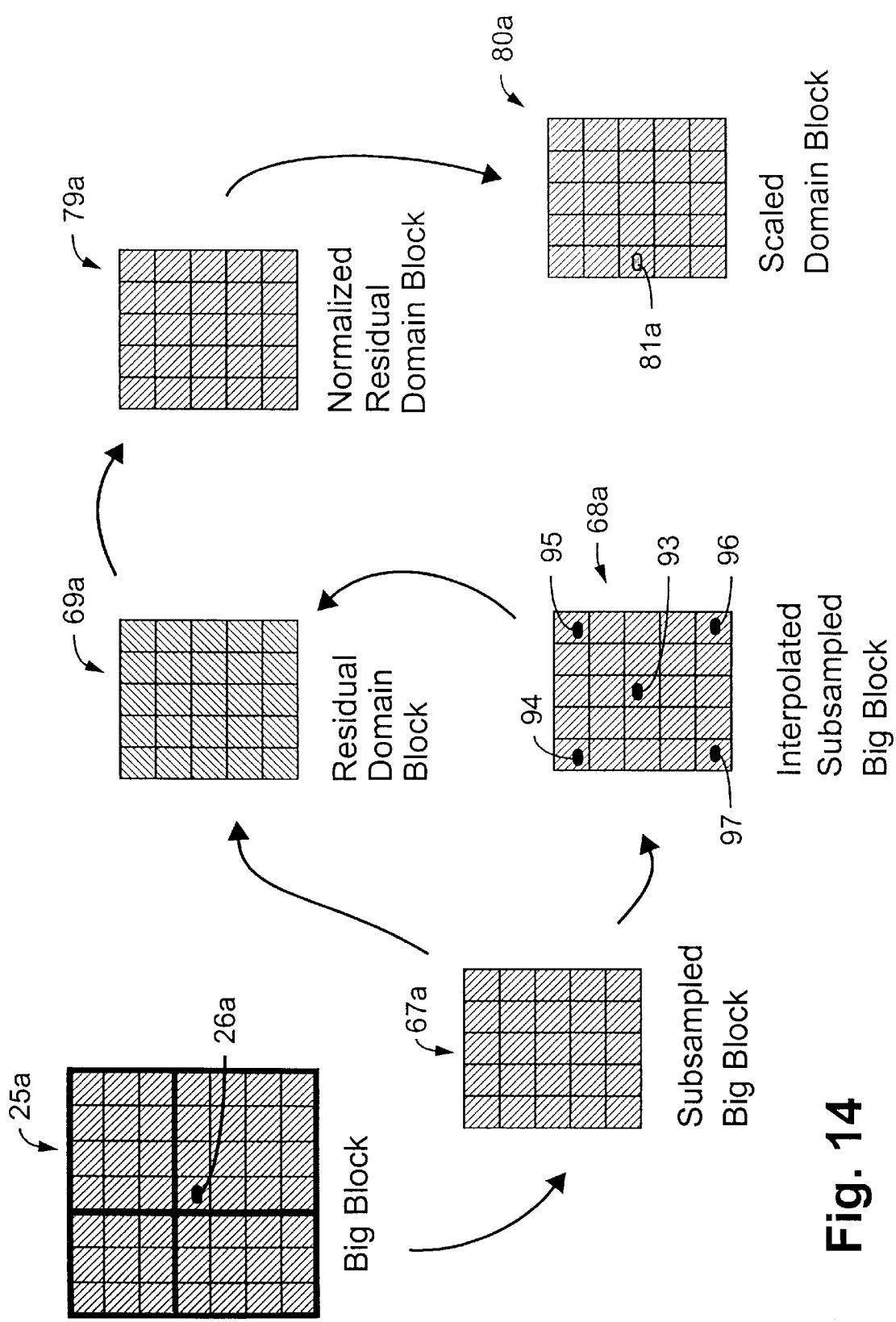
FIG. 14 illustrates the same process of FIG. 12 but for the utilization of a different big block.

1. The alternative embodiment divides an image up in the same manner as the first embodiment. This includes a series of grid blocks 16 (FIG. 5), and grid points 9 and grid blocks 16 (FIG. 6).
2. An interpolated image 61 is determined based on the grid points e.g. 9 using the chosen interpolation method. This interpolated image forms a current approximation to the range block.
3. The residual of each pixel of each range block is determined with respect to the interpolation. This residual is the difference between the actual pixel values and the interpolated pixel values. This residual forms a current range block residual 62 for each range block.
4. A big block 25 (FIG. 12) of size (2N+1)×(2N+1) is then formed, with the big block 25 having a centre pixel 26 which falls on one of the pixels of a corresponding grid block. This big block is then subsampled in the same manner as the first embodiment to form a subsampled big block 67 having the same dimensions as the corresponding grid block 16 (FIG. 13).
5. Each grid block 16, will have, at its corners, one of four grid points 9,17–19 from which the interpolation of the range block was found in step 2. A corresponding interpolation of the (N+1)×(N+1) sized subsampled big block is obtained 68 using the corner pixels of the subsampled big block 67.
6. A residual domain block 69, being the difference between the subsampled big block 67 and the interpolated subsampled big block 68 is obtained. This difference is then normalised 79, with the preferred method of normalisation being a division by the square root of the sum of the square of the pixel differences.
7. The normalised residual domain block 79 is then scaled to form scaled residual domain block 80, the scaling being such that the pixel 81 is of equivalent magnitude to pixel 82 of the residual grid block 62 of FIG. 13.
8. The steps 4–7 are repeated for all possible big blocks whose centre falls on one of a corresponding grid block pixel. The scaled residual domain block 80 which best matches a current residual grid block 62 in a root mean square sense is then chosen as the best scaled domain block.
9. The scaled residual domain block 80 is then added to the current approximation to the range block 61 to form a new approximation to the range block 84 (FIG. 13).
10. A new residual grid block 85 is then calculated, being the difference between grid block 16 and the new approximation to the range block 84. This new residual grid block will have zero values at the points 87–91 as they have been fixed by the scaling process.
11. Next, an alternative big block 25a (FIG. 14) is chosen, the alternative big block being one which has not, as yet, been used in the encoding process.
12. This big block is subsampled to form subsampled big block 67a. The subsampled big block is then interpolated at equivalent points 93–97 to all points which have thus far been fixed by the encoding process.
13. A residual 69a is then determined, being the difference between subsampled big block 67a and interpolated subsample big block 68a. This residual is then subsequently normalised 79A.
14. The normalised residual domain block 79a is then scaled to form a scaled domain block 80a such that the scaled residual at the next point to be fixed e.g. 81a, for the second domain block, has the value of the new residual grid block 85 (FIG. 13) at an equivalent point 93.
15. The steps 11–14 are repeated for each of the remaining candidate domain blocks (big blocks 26A) and the domain block which best matches the current range block residual in a root mean square sense is chosen.
16. The steps 9–14 are then repeated, for a predetermined sequence of fixed points, until the RMS error in the range block approximation is reduced below a predetermined level.
17. The steps 1–16 can then be repeated for each of the range blocks within the image.

The encoding for each range block of an image will then consist of the value of the grid point e.g. 9 in the top left hand corner of each range block and the big block offset values (i.e. domain block offset values) for the series of chosen big blocks in addition to a scaling factor for each of the chosen big blocks.

The Decoding Process of the Second Embodiment

The decoding process can be carried out for a pixel array of any resolution and proceeds as follows:

1. Each of the pixel grid points stored with each range block are set to their stored values.
2. The pixel image can then be formed from an interpolation of the grid points. This interpolation process then forms a base image approximation.
3. The base image approximation is copied to a temporary array called the "current image estimate".
4. A copy of a "current range block" from the base image approximation is made and forms the "current range block estimate".
5. For a current range block, the domain block, as determined by the big block offset, is extracted from the current image estimate and is subsampled so as to be of the same pixel dimensions as the range block.
6. An interpolation of the subsampled domain block using the appropriate predetermined fixed pixels for that domain block is calculated.
7. The normalised residual is in turn calculated from the interpolation of the subsampled domain block and the subsampled domain block itself.
8. The normalised residual is scaled by the relevant stored scale factor for the current domain block.
9. The scaled normalised residual from step 8 is added to the current range block estimate.

10. The current range block estimate is copied to the appropriate range block in the current image approximation.

11. The steps 5 to 10 are repeated for all the domain blocks stored for the current range block.

12. The steps 4 to 11 are repeated for all the range blocks in the image.

13. The steps 4 to 12 are iterated until the current image estimate converges, with convergence being measured in the normal sense.

Further Aspects of the Invention

Further embodiments of the invention will now be described with reference to FIGS. 15 to 18.

Figure 15:
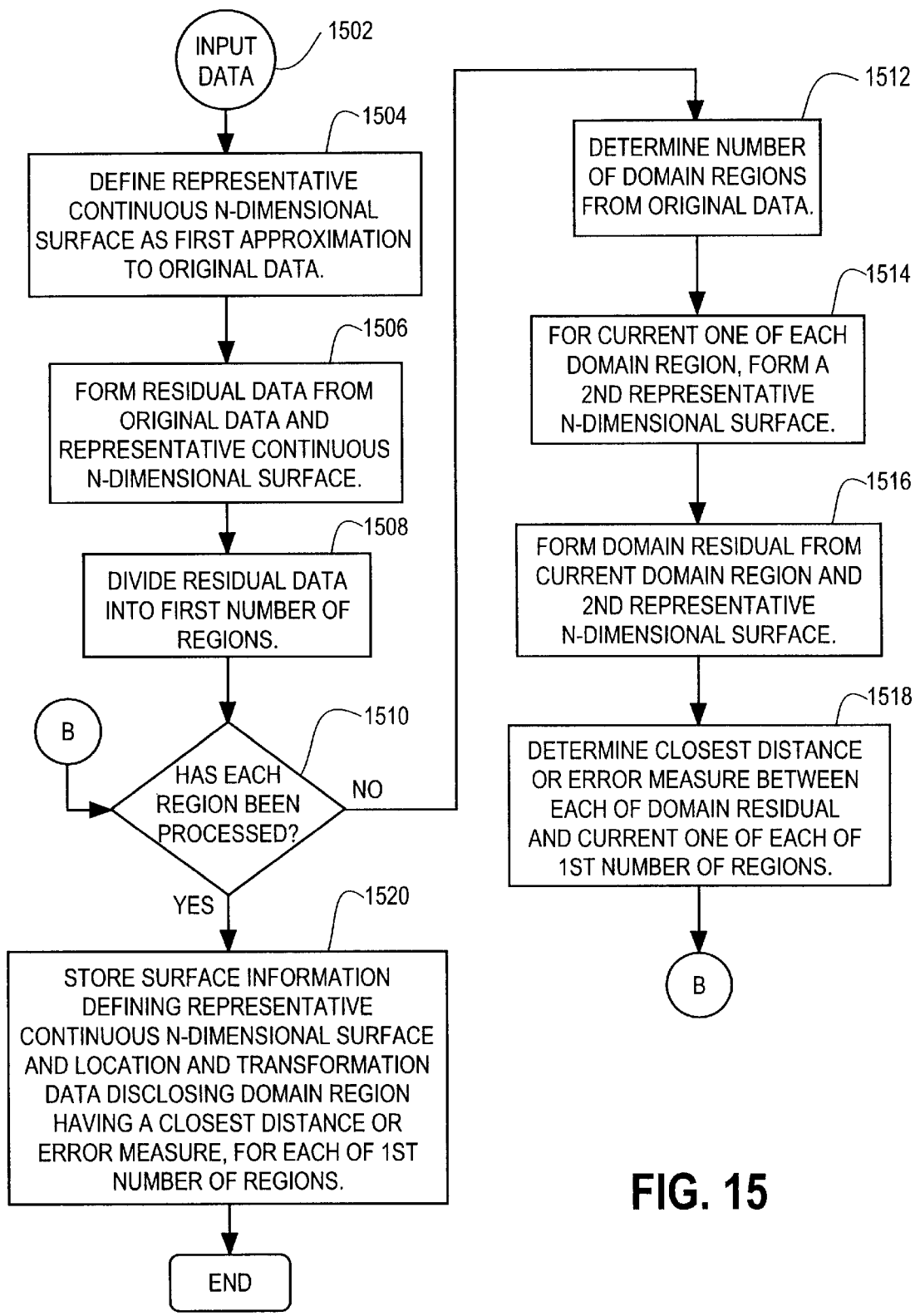
FIG. 15 is a flow chart illustrating the encoding process according to a third embodiment of the invention.

A flow chart of a method of encoding original data 1502 is shown in FIG. 15. In step 1504, a representative continuous n-dimensional surface is defined as a first approximation to the original data 1502. In step 1506, residual data is formed from the original data and the representative continuous n-dimensional surface. In step 1508, the residual data is divided into a first number of regions.

In decision block 1510, a check is made to determine if each of the first number of regions has been processed. This is done to ensure that, for each of the first number of regions, steps 1512 to 1518 are performed. If decision block 1510 returns false (NO), processing continues at step 1512.

In step 1512, a number of domain regions are determined from the original data in which the domain regions comprise transformed portions of the original data. In step 1514, for a current one of each of the domain regions, a second representative n-dimensional surface is formed from the current domain region. In step 1516, a domain residual is formed from the current domain region and the second representative n-dimensional surface. In step 1518, a closest distance, or error measure, between each of the domain residual and a current one of each of the first number of regions is determined. Processing continues at decision block 1510.

Otherwise, if decision block 1510 returns true (YES), processing continues at step 1520. In step 1520, surface information defining the representative continuous n-dimensional surface and location and transformation data disclosing the domain region having a domain residual having a closest distance or error measure are stored, for each of the first number of regions.

Preferably, the surface information defining the representative continuous n-dimensional surface includes data values at predetermined locations of the surface. Further, at least one data value may be located within each corresponding region of the first number of regions. Still further, the surface may be defined from one of linear interpolation or cubic spline interpolation of the data values.

Preferably, each of the domain regions is derived from an area overlapping the current one of each of the first number of regions. Further, the transformed portion of the residual data may include sub-sampling the residual data. Still further, the transformation optionally may include one of scaling, rotation, horizontal reflection, vertical reflection or diagonal reflection of the portion of the residual data.

Preferably, the domain regions include a domain region derived from a block of data having a centre corresponding to the location of a data value within the current one of each of the first number of regions and a separate domain region being defined for each of the locations of data values within the regions.

Preferably, the number of dimensions is three.

Figure 16:
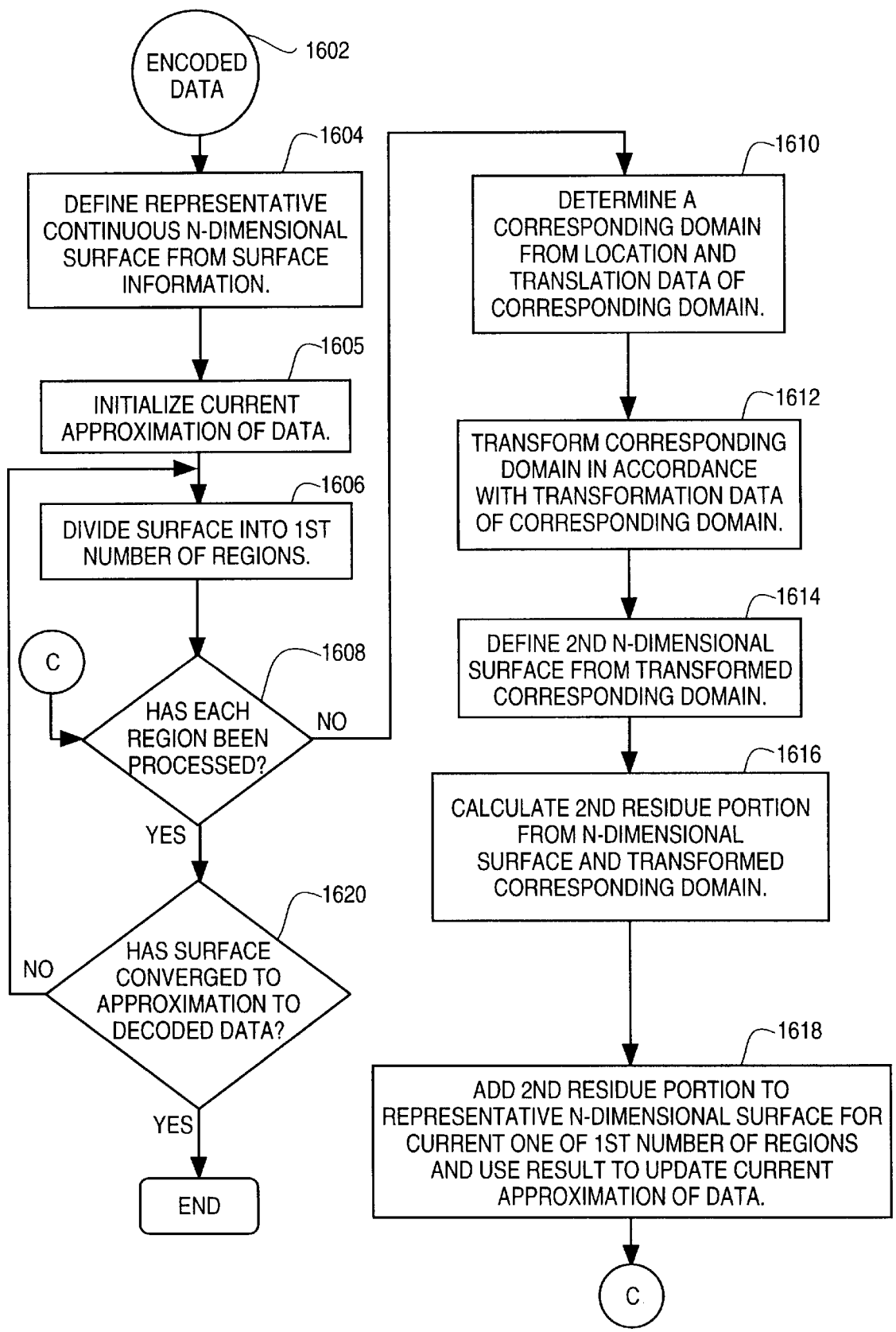
FIG. 16 is a flow chart illustrating the decoding process according to the third embodiment shown in FIG. 15.

A flowchart of a method of decoding data 1602, which has been coded in accordance with FIG. 15, is shown in FIG. 16. In step 1604, the representative continuous n-dimensional surface is defined from the surface information. The n-dimensional surface is the basis for the new range block approximation. In step 1605, the current approximation of the data is initialised. The current approximation is where domain blocks are taken from. In step 1606, the surface is divided into the first number of regions.

In decision block 1608, a check is made to determine if each of the first number of regions has been processed. This is done to ensure that, for each of the first number of regions, steps 1610 to 1618 are applied. If decision block 1608 returns false (NO), processing continues at step 1610.

In step 1610, a corresponding domain from the location and translation data for the region are determined. In step 1612, the corresponding domain is transformed in accordance with the transformation data of the corresponding domain. In step 1614, a second n-dimensional surface is defined from the transformed corresponding domain. In step 1616, a second residue portion is calculated from the second n-dimensional surface and the transformed corresponding domain. In step 1618, the second residue portion is added to the representative continuous n-dimensional surface for the current one of the first number of regions and the result is used to update current approximation of data. Processing then continues at decision block 1608. If decision block 1608 returns true (YES), processing continues at decision block 1620.

In decision block 1620, a check is made to determine if the surface has converged to an approximation to the decoded data. This is done to ensure that steps 1606 to 1618 are repeated until the surface converges to an approximation to the decoded data. If decision block 1620 returns false (NO), processing continues at step 1606. Otherwise, if decision block 1620 returns true (YES), processing terminates.

Preferably, the convergence comprises one of repeating steps 1606 to 1618 a predetermined number of times or the surface undergoing less than a predetermined amount of alteration between successive repetitions of steps 1606 to 1618.

Figure 17:
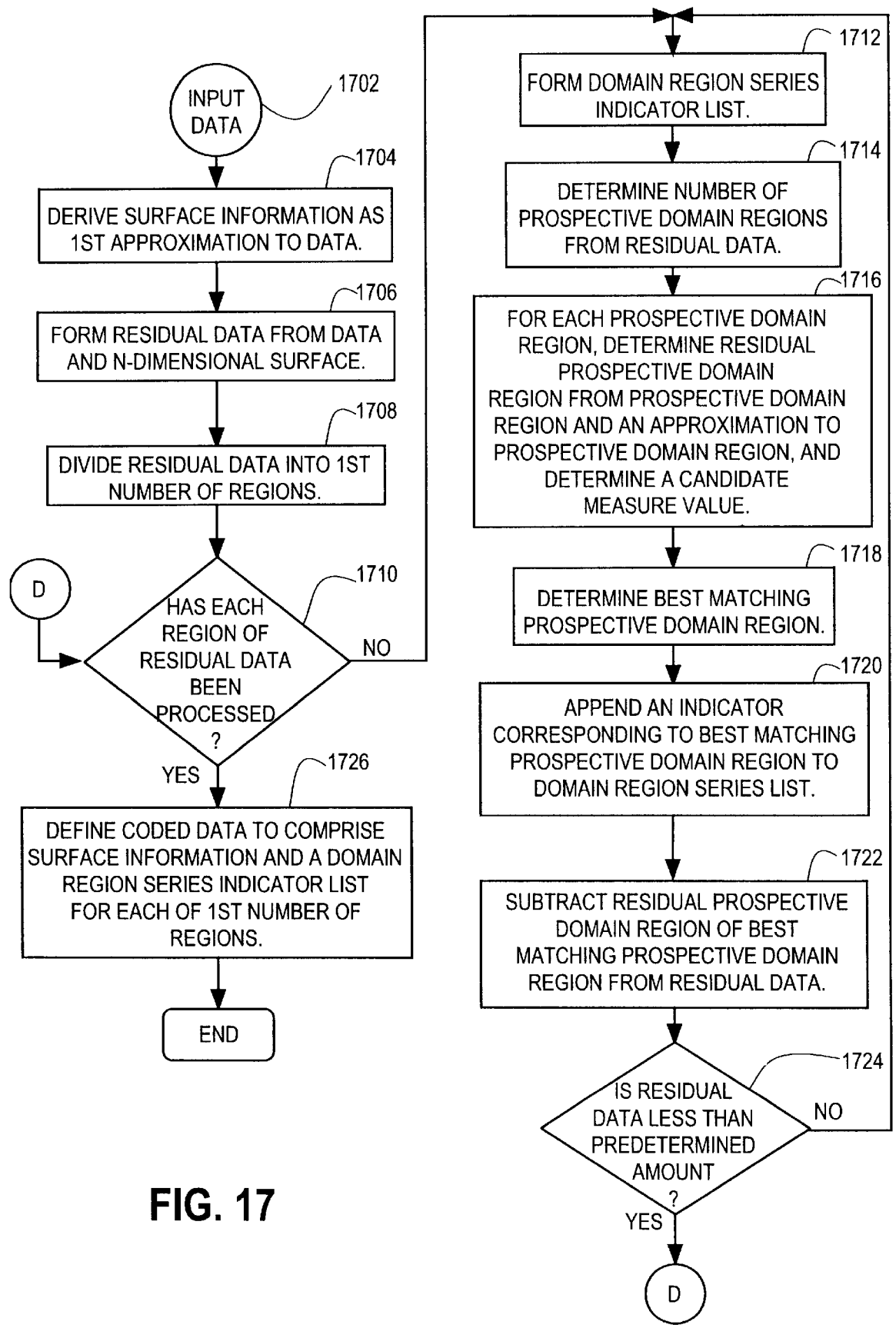
FIG. 17 is a flow chart illustrating the encoding process according to a fourth embodiment of the invention.

A flowchart of a method of encoding data 1702 according to a fourth embodiment is shown in FIG. 17. In step 1704, surface information, which defines an n-dimensional surface, is derived as a first approximation to the data. In step 1706, residual data is formed from the data in the n-dimensional surface. In step 1708, the residual data is divided into a first number of regions.

In decision block 1710, a check is made to determine if each region of the residual data has been processed. This is done to ensure that, for each of the first number of regions, a corresponding series of domain regions are determined in accordance with steps 1712 to 1722. If decision block 1710 returns false (NO), processing continues at step 1712.

In step 1712 a domain region series indicator list is formed, which initially comprises an empty list. In step 1714, a number of prospective domain regions are determined from the residual data. In step 1716, for each of the prospective domain regions, a residual prospective domain region is determined from the prospective domain region in an approximation to the prospective domain region, and a candidate measure value, being a measure of the difference between the residual prospective domain region and the first one of the first number of regions, is determined. In step 1718, a best matching prospective domain region, being a domain region which is not a member of the domain region series indicator list and having the smallest of the candidate measure values, is determined. In step 1720, an indicator corresponding to the best matching prospective domain region is appended to the domain region series list. In step 1722, the residual prospective domain region of the best matching prospective domain region is subtracted from the residual data.

In decision block 1724, a check is made to determine if the residual data is less than a predetermined amount. This is done to ensure that steps 1712 to 1722 are repeated until the residual data is less than a predetermined amount. If decision block 1724 returns false (NO), processing continues at step 1712. Otherwise, if decision block 1724 returns true (YES), processing continues at decision block 1710.

If decision block 1710 returns true (YES), processing continues at step 1726. In step 1726, the coded data are defined to be the surface information and a domain region series indicator list for each of the first number of regions.

Preferably, step 1716 comprises scaling the residual prospective domain region such that a predetermined portion of the residual prospective domain region is equal to a corresponding portion of the residual data and step 1726 includes defining the coded data to include a scale factor for each of the domain regions in the domain region indicator list. Further, the prospective domain regions may include a subsampling of the data. Optionally, the prospective regions may overlap corresponding ones of the first number of regions.

Still further, optionally step 1716 may further comprise normalising the residual prospective domain region before determining the candidate measure value.

Figure 18:
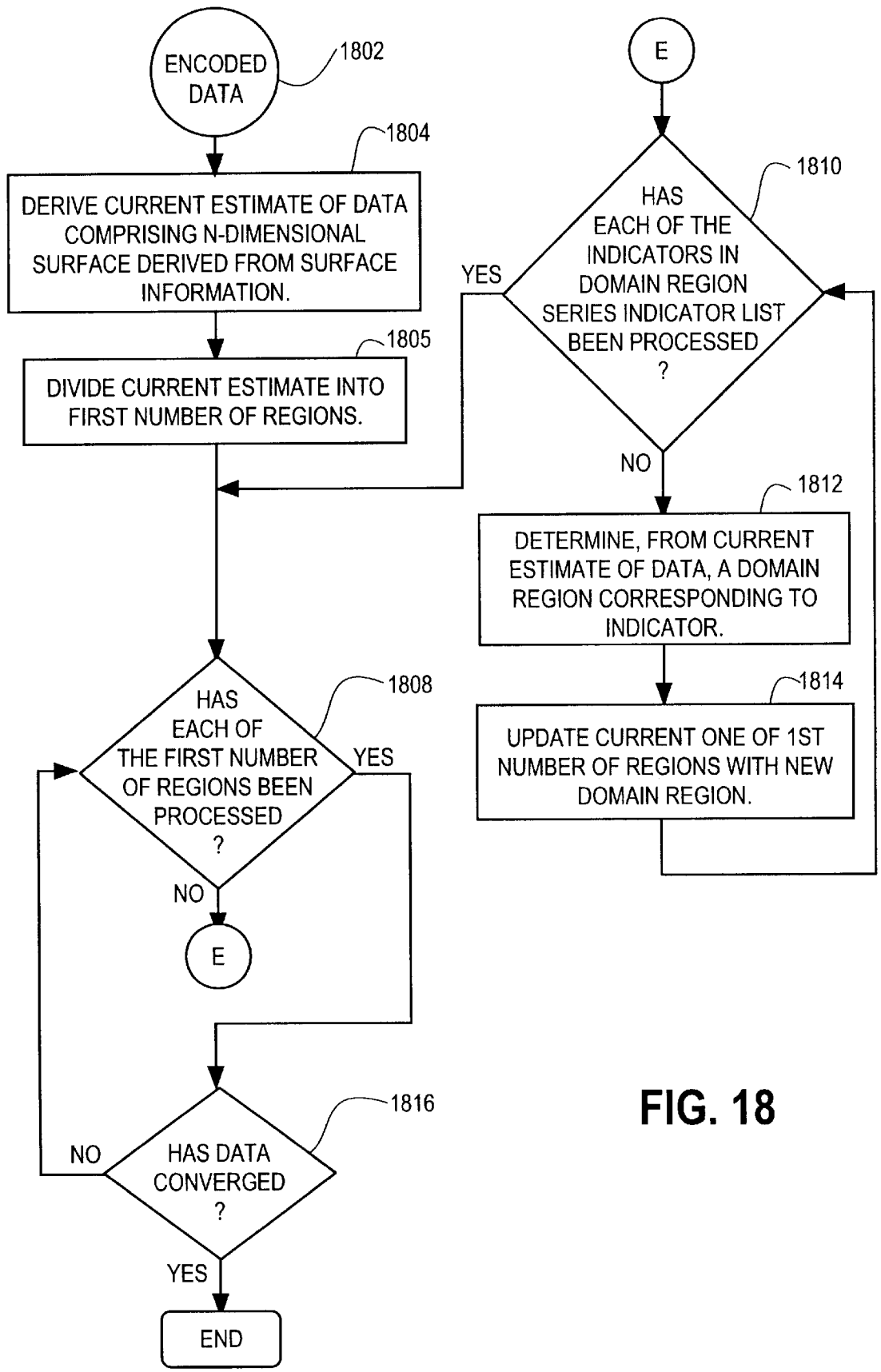
FIG. 18 is a flow chart illustrating the decoding process according to the fourth embodiment shown in FIG. 17.

A flowchart of a method of decoding data 1802, which has been encoded in accordance with FIG. 17, is shown in FIG. 18. In step 1804, a current estimate is derived of the data comprising an n-dimensional surface derived from the surface information. In step 1805, the current estimate is divided into the first number of regions.

In decision block 1808, a check is made to determine if each of the first number of regions has been processed. This is done to ensure that, for each of the first number of regions, steps 1810 to 1814 are applied. If decision block 1808 returns false (NO), processing continues at decision block 1810.

In decision block 1810, a check is made to determine if each of the indicators in the domain region series indicator list has been processed. This is done to ensure that, for each of the indicators in the domain series indicator list, steps 1812 and 1814 are applied.

If decision block 1810 returns false (NO), processing continues at step 1812. In step 1812, from the current estimate of the data, a domain region corresponding to the indicator is determined. In step 1814, the current one of the first number of regions is updated by subtracting the previous estimate of the current domain region from the current one of the first number of regions and adding the current estimate of the current domain region. If this is the first time this domain region has been derived then the subtraction step can be omitted. Processing continues at decision block 1810. If decision block 1810 returns true (YES), processing continues at decision block 1808. If decision block 1808 returns true (YES), processing continues at decision block 1816.

In decision block 1816, a check is made to determine if the data has converged. This is done to ensure that steps 1808 to 1814 are repeated until the data converges. If decision block 1816 returns false (NO), processing continues at decision block 1808. Otherwise, if decision block 1816 returns true (YES), processing terminates.

Preferably, step 1812 comprises deriving a residue comprising the difference between the current estimate of the data and a surface approximation to the current estimate of the data.

Preferably, step 1812 includes sub-sampling the current estimate of the data.

Preferably, step 1812 comprises normalising the domain region and scaling by the corresponding scaling factor stored in the encoded data.

Preferably, step 1814 comprises subtracting the previous estimate of the current domain region from the current one of the first number of regions and adding in the domain region derived in step 1812.

The embodiments of the invention described above rely on matching pixel values contained in the image in a well-defined sequence. In such processes, the first pixel is matched by the lowest-level approximation to the range block. Subsequent pixels are matched by adding an appropriately scaled domain block residual in which the residual is formed with respect to an interpolation of the set of points in the domain block corresponding to the current set of fixed points in the range block. This in effect can be understood to be matching the terms in a non-orthogonal basis expansion in which the basis functions are the interpolation kernels defined by the interpolation process, as described above.

In a further embodiment of the invention, terms are matched in another basis expansion where the terms have finite support. For example, this could include a wavelet expansion. As is well known in the art, the wavelet basis space is comprised of a space defined by translates of a scaling function with compact support which describes the lowest frequency part of the data. It is also comprises a space spanned by translates and dilates of "mother wavelets".

Figure 19:
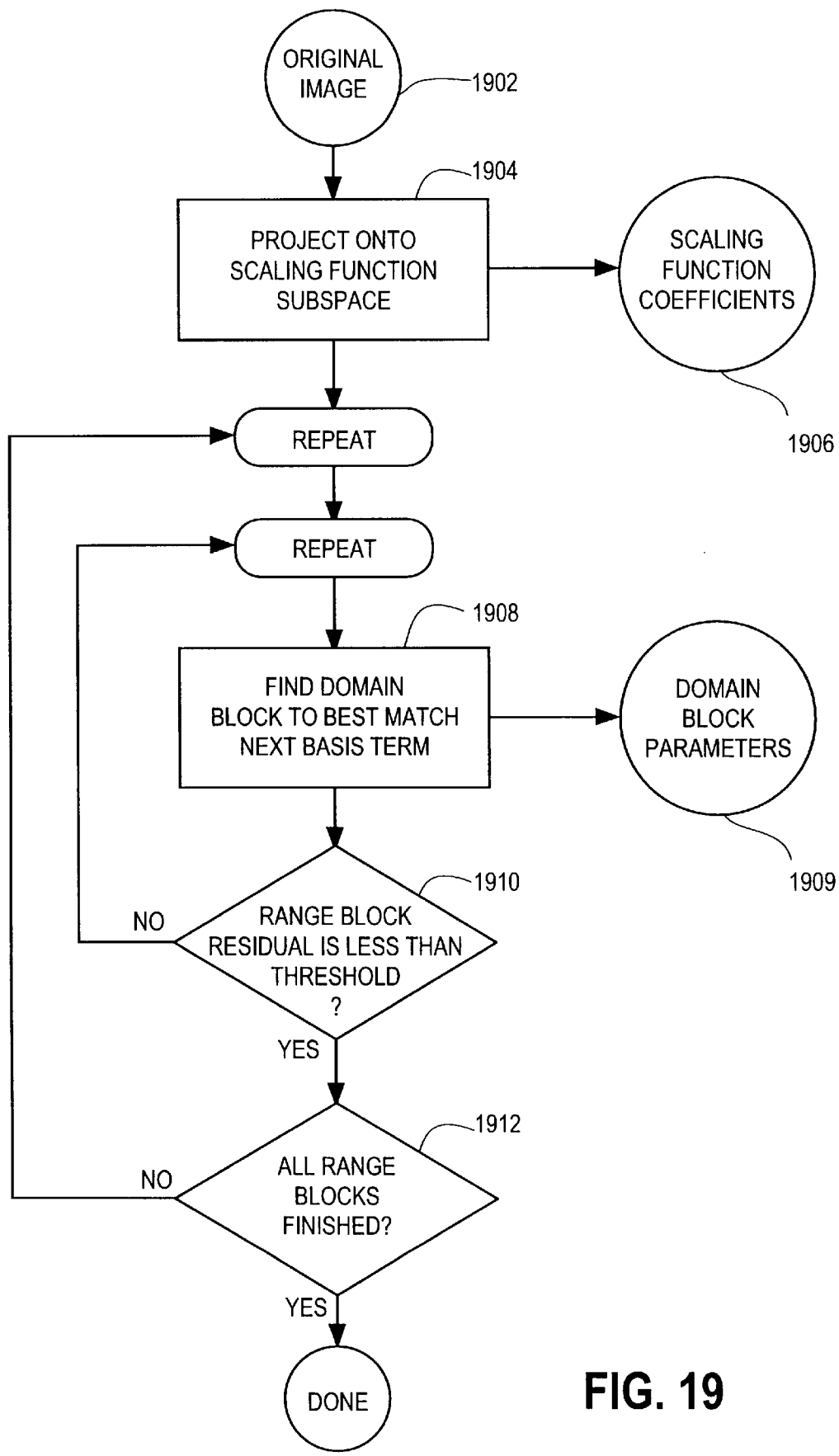
FIG. 19 is a flow chart illustrating the encoding process according to a fifth embodiment of the invention.

A method of encoding data 1902 according to the further embodiment is illustrated in FIG. 19. For such a wavelet decomposition of an image, an ordering of the basis terms is defined such that each scaling function is associated with a range block. The rest of the basis functions are ordered so that they are associated with one, and only one, of the range blocks (the range block with which they are spatially most naturally associated) and are ordered on the basis of their scale. This is done so that the coarse scale terms have higher priority than the fine scale terms.

In step 1904, the image is projected into a subspace defined by the scaling function terms. This produces the scaling function coefficients 1906.

For each range block, a set of domain blocks is defined which can be considered in the formation of a fractal expansion. For example, these may be blocks of twice the linear size of the range block and that have centers within the range block.

In step 1908, the domain block to best match the next basis term is found, and the domain block parameters 1909 are produced. This comprises the following steps:

(i) For a chosen domain block candidate, the domain block is shrunk and it is translated to give a block with the same geometry as the range block.

(ii) The domain block is projected onto the subspace defined by all the basis wavelets associated with the range block and which have not previously been matched in the representation of the range block. This includes initially all associated basis terms except the one translate of the scaling function which defines the range block.

(iii) The resulting projection is normalised.

(iv) The residual is calculated for the range block. This is the difference between the current representation of the range block and the sum of all the basis terms in the full image associated with this range block.

(v) The projection from step (iii) is scaled so that, in its expansion, the coefficient of the next unmatched basis term in the sequence matches the corresponding coefficient in the residual obtained from step (iv).

(vi) All candidate domain blocks are tried and the block for which the error in the resulting representation is minimised is that which is chosen. The error may be the root mean square error or the other chosen measure.

In step 1910, a check is made to determine if the range block residual is less than a predetermined threshold value. This is done to ensure that step 1908, which comprises steps 1908(i) to 1908(vi), are repeated, adding domain block terms in sequence order, until the error (rms or other chosen measure) from step 1908(iv) falls below a predetermined threshold. If decision block 1910 returns false (NO), processing continues at step 1908. Otherwise, if decision block 1910 returns true (YES), processing continues at decision block 1912.

In decision block 1912, a check is made to determine if all range blocks are finished. This is done to ensure that step 1908, including steps 1908(i) to 1908(vi), is repeated for all range blocks. If decision block 1912 returns false (NO), processing continues at step 1908. Otherwise, if decision block 1912 returns true (YES), processing terminates.

Figure 20:
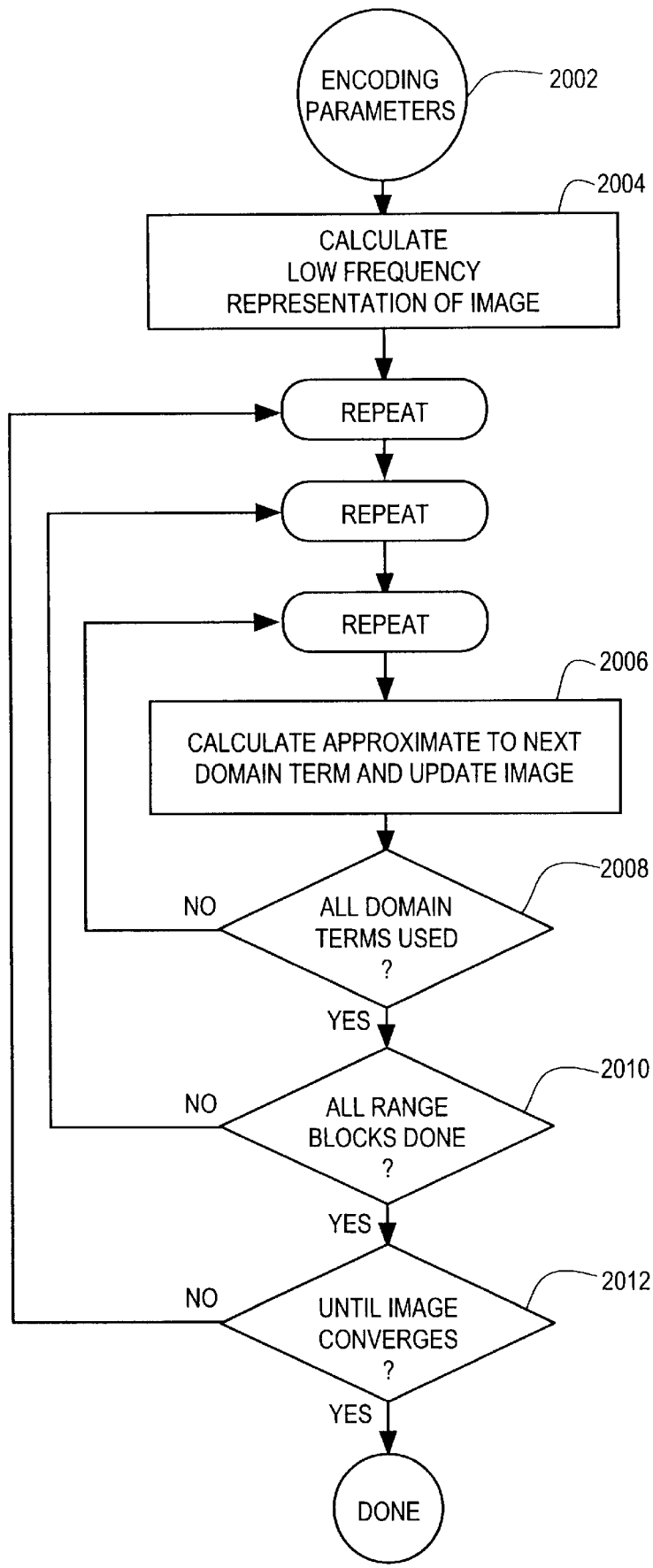
FIG. 20 is a flow chart illustrating the decoding process according to the fifth embodiment of the invention.

A method of decoding data 2002, which is encoded in accordance with the method of FIG. 19, is illustrated in FIG. 20. In step 2002, the low frequency representation of the image is calculated from the scaling function coefficients. The calculated result from step 2002 is used to initialise the current approximation to the image.

In step 2006, an approximation to the next domain term is calculated and the image is updated. This comprises the following steps:

(i) For the current range block, the approximation to the current domain block is obtained from the current approximation to the image.

(ii) The block is shrunk and shifted to adjust the geometry to match the range block.

(iii) The result of step (ii) is projected onto the subspace spanned by the basis terms later in the defined sequence than and including the basis term associated with the current domain block.

(iv) The resulting projection from step (iii) is normalised.

(v) The result obtained from step (iv) is scaled by the stored scaling factor.

(vi) The scaled result from step (v) is used to update the current representation of the range block.

(vii) The current approximation to the image is updated to reflect the changes in this range block.

In decision block 2008, a check is made to determine if all domain terms have been used. This is done to ensure that step 2006, comprising steps 2006(i) to 2006(vii), is repeated to incorporate all domain blocks for the range block. If decision block 2008 returns false (NO), processing continues at step 2006. Otherwise, if decision block 2008 returns true (YES), processing continues at decision block 2010.

In decision block 2010, a check is made to determine if all range blocks are done. This is done to ensure that steps 2006, comprising steps 2006(i) to 2006(vii), and 2008 are repeated for all range blocks. If decision block 2010 returns false (NO), processing continues at step 2006. Otherwise, if decision block 2010 returns true (YES), processing continues at decision block 2012.

In decision block 2012, a check is made to determine if the image has converged. This is done to ensure that steps 2006, comprising steps 2006(i) to 2006(vii), and 2010 are repeated until the result converges. If decision block 2012 returns false (NO), processing continues at step 2006. Otherwise, if decision block 2012 returns true (YES), processing ends.

The foregoing describes a number of embodiments of the present invention with modifications. Further modifications, obvious to those skilled in the art, can be made thereto without departing from the scope of the invention.

What is claimed is:

1. A method of coding original data comprising the steps of:

(a) defining a representative continuous n-dimensional surface as a first approximation to said original data, (b) forming residual data from said original data and said representative continuous n-dimensional surface, (c) dividing said residual data into a first number of range regions, (d) for each of said first number of range regions, performing the following steps (e) to (h):

(e) determining a number of domain regions from said original data, said domain regions comprising transformed portions of said original data, (f) for a current one of each of said domain regions, forming a second representative n-dimensional surface from said current domain region, (g) forming a domain residual from said current domain region and said second representative n-dimensional surface, (h) scaling said domain residual to approximate residual in a current range region, wherein said scaling exactly matches one of a plurality of terms in a basis expansion of said current range region, and wherein said scaling forms a scaled domain region having location and transformation data associated with said scaled domain region; and (i) repeating steps (f) to (h) and choosing a scaled domain region which best matches said residual in said range region;

(j) adding said best matching scaled domain region to said first representative n-dimensional surface for said first number of range partitions to form a new representative n-dimensional surface;

(k) forming new residual from said original data and said new representative n-dimensional surface;

(l) repeating steps (d) to (h) until a second approximation is determined; and (m) repeating steps (d) to (k) for all of said first number of range partitions.

2. The method according to claim 1 wherein said new representative continuous n-dimensional surface includes data values at predetermined locations of said new representative continuous n-dimensional surface.

3. The method according to claim 2 wherein at least one data value is located within each corresponding region of said first number of range regions.

4. The method according to claim 3 wherein said new representative continuous n-dimensional surface is defined from an interpolation of said data values.

5. The method according to claim 1 wherein each of said domain regions is derived from an area overlapping said current one of each of said first number of range regions.

6. The method according to claim 5 wherein said transformed portions of said original data include subsampling said original data.

7. The method according to claim 5 wherein said transformation optionally include one of scaling, rotation, horizontal reflection, vertical reflection or diagonal reflection of said portion of said residual data.

8. The method according to claim 1 wherein said domain regions include a domain region derived from a block of data having a center corresponding to the location of a data value within said current one of each of said first number of regions and a separate domain region being defined for each of said locations of data values within said regions.

9. The method according to claim 1 wherein the number of dimensions is three.

10. A method of decoding data which has been coded in accordance with any one of claims 1, said method of decoding comprising the steps of:
 (a) defining said representative continuous n-dimensional surface from said surface information,
 (b) dividing said surface into said first number of regions,
 (c) for each of said first number of regions, applying the steps of:
  (d) determining a corresponding domain from said location and translation data for said region,
  (e) transforming said corresponding domain in accordance with said transformation data of said corresponding domain,
  (f) defining a second n-dimensional surface from said transformed corresponding domain,
  (g) calculating a second residue portion from said second n-dimensional surface and said transformed corresponding domain,
  (h) adding said second residue portion to the representative continuous n-dimensional surface of a said current one of said first number of regions and updating current approximation of data, and
 (i) repeating steps (b)–(h) until said surface converges to an approximation to said decoded data.

11. The method according to claim 10 wherein said convergence comprises one of repeating steps (b)–(h) a predetermined number of times or said surface undergoing less then a predetermined amount of alteration between successive repetitions of steps (b)–(h).

12. A method of encoding data comprising the steps of:
 (a) deriving surface information, which defines an n-dimensional surface, as a first approximation to said data,
 (b) forming residual data from said data and said n-dimensional surface,
 (c) dividing said residual data into a first number of regions,
 (d) for a first one of said first number of regions, determining a corresponding series of domain regions in accordance with the following steps (e) to (j):
  (e) forming a domain region series indicator list, initially comprising an empty list,
  (f) determining a number of prospective domain regions from said residual data,
  (g) for each of said prospective domain regions, determining a residual prospective domain region from said prospective domain region and an approximation to said prospective domain region, and determining a candidate measure value being a measure of the difference between said residual prospective domain region and the first one of said first number of regions,
  (h) determining a best matching prospective domain region, being a domain region which is not a member of said domain region series indicator list and having the smallest of said candidate measure values,
  (i) appending an indicator corresponding to said best matching prospective domain region to a said domain region series list, and
  (j) subtracting the residual prospective domain region of said best matching prospective domain region from said residual data,
 (k) repeating steps (e) to (j) until said residual data is less than a predetermined amount,
 (l) repeating steps (d) to (k) for each region of said residual data;
 (m) defining said coded data to comprise said surface information and a domain region series indicator list for each of said first number of regions; and
  wherein step (g) further comprises non-linearly normalising said residual prospective domain region before determining said candidate measure value.

13. A method of encoding data comprising the steps of:
 (a) deriving surface information, which defines an n-dimensional surface, as a first approximation to said data,
 (b) forming residual data from said data and said n-dimensional surface,
 (c) dividing said residual data into a first number of regions,
 (d) for a first one of said first number of regions, determining a corresponding series of domain regions in accordance with the following steps (e) to (j):
  (e) forming a domain region series indicator list, initially comprising an empty list,
  (f) determining a number of prospective domain regions from said residual data,
  (g) for each of said prospective domain regions, determining a residual prospective domain region from said prospective domain region and an approximation to said prospective domain region, and determining a candidate measure value being a measure of the difference between said residual prospective domain region and the first one of said first number of regions,
  (h) determining a best matching prospective domain region, being a domain region which is not a member of said domain region series indicator list and having the smallest of said candidate measure values,
  (i) appending an indicator corresponding to said best matching prospective domain region to a said domain region series list, and
  (j) subtracting the residual prospective domain region of said best matching prospective domain region from said residual data,
 (k) repeating steps (e) to (j) until said residual data is less than a predetermined amount,
 (l) repeating steps (d) to (k) for each region of said residual data;
 (m) defining said coded data to comprise said surface information and a domain region series indictor list for each of said first number of regions; and
  wherein said step (g) comprises scaling said residual prospective domain region such that a predetermined portion of said residual prospective domain region is equal to a corresponding portion of said residual data and said step (m) includes defining said coded data to include a scale factor for each of said domain regions in said domain region indicator list.

14. The method according to claim 13 wherein said prospective domain regions include a subsampling of said data.

15. The method according to claim 13 wherein said prospective domain regions overlap corresponding ones of said first number of regions.

16. A method of decoding data which has been encoded in accordance with claim 13, said method comprising the steps of:

(a) deriving a current estimate of said data comprising an n-dimensional surface derived from said surface information, (b) dividing said current estimate into said first number of regions, (c) for a first one of said first number of regions, applying the steps (d) to (g):

(d) for a first one of said indicators in said domain region series indicator list, applying the steps (e) to (f):

(e) determining, from said current estimate of said data, a domain region corresponding to said indicator, (f) update current estimate of current one of said first number of regions with new estimate of current domain region, (g) repeating steps (d) to (f) for each of said indicators in said domain region series indicator list, (h) repeating steps (c) to (g) for each of said first number of regions, and (i) repeating steps (c) to (h) until said data converges.

17. The method according to claim 16 wherein said determining step includes deriving a residue comprising the difference between said current estimate of said data and a surface approximation to said current estimate of said data.

18. The method according to claim 16 wherein said determining step (e) includes sub sampling said current estimate of said data.

19. The method according to claim 16 wherein step (e) further comprises normalising said domain region and scaling by the corresponding scaling factor stored in the encoded data.

20. The method according to claim 16 wherein step (f) comprises subtracting the previous estimate of the current domain region from said current one of said first number of regions and adding in said domain region derived in step (e).

* * * * *